INVENTOR:
KARL EVALD ANDREAS GOTHBERG

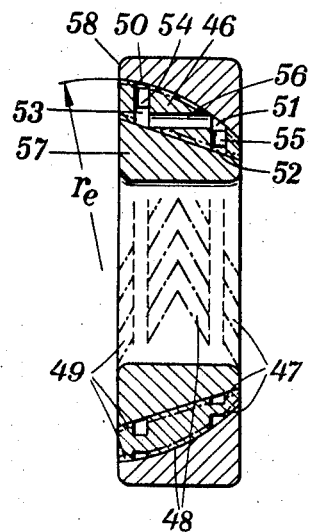
Fig. 6
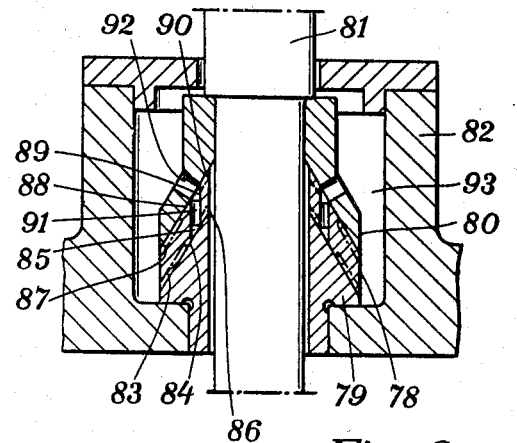
Fig. 8
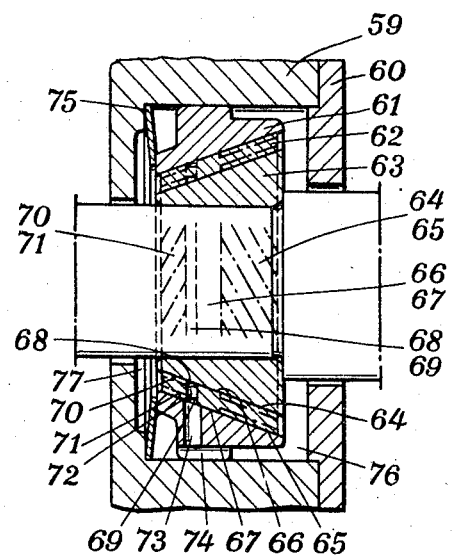
Fig. 7
Fig. 9

United States Patent Office 3,439,962
Patented Apr. 22, 1969

3,439,962
REVERSIBLE SLIDING BEARINGS OF SPIRAL OR HELICAL GROOVE TYPE
Karl Evald Andreas Gothberg, Lerum, Sweden, assignor to SKF Industries, Inc., King of Prussia, Pa., a corporation of Delaware
Filed June 2, 1967, Ser. No. 643,290
Int. Cl. F16c 7/04, 35/00
U.S. Cl. 308—9                                23 Claims

ABSTRACT OF THE DISCLOSURE

A reversible sliding bearing of the spiral or helical groove type comprising a stationary member, a rotatable member, both having sliding confronting bearing surfaces and an intermediate member disposed between the sliding surfaces of the stationary and rotatable members. The intermediate member has sliding surfaces which confront and conform in shape to the sliding surfaces of the rotatable and stationary members. Shallow grooves are provided in the confronting sliding surfaces, for example in the sliding surfaces of the intermediate member which are arranged in such a manner so that upon rotation of the rotatable member relative to the stationary member, in one direction there is a pressure build up of a fluid medium between the confronting sliding surfaces of the intermediate member and one of the other members supporting the members for relative rotation.

---

The present invention relates to sliding bearings for carrying thrust, radial, or combined loads which comprise a stationary and a rotatable member between the co-acting sliding surfaces of which a pressure medium such as grease, a liquid, or a gas, especially air, is introduced, one of the said sliding surfaces having a number of regularly spaced grooves therein of such extension in the direction of rotation that pressure medium is pumped into a pressure zone between the members.

For the sake of convenience a bearing of this kind is in the following designated generally as a spiral groove bearing. In order to provide a pumping action in the desired direction the spiral groove bearing can be rotated in the proper direction only. For this reason, the field of use of hitherto known spiral groove bearings has been greatly restricted, since many types of machines must be able to run in both directions. Conversely, the usefulness of the spiral groove bearing would be considerably increased if it could be designed to function when rotating in either direction.

The present invention provides a solution to this problem and also provides considerable advantages. A reversible spiral groove bearing according to the present invention requires only slightly more space than a uni-directional bearing of this type and by effectively utilizing the bearing space its load carrying capacity may be made equally great in both directions whereby a frequent requirement may be met.

According to the invention, an intermediate member is provided between the sliding surfaces of the stationary and the movable bearing members, the surfaces of the said intermediate member conforming substantially to the sliding surfaces and usually having shallow grooves of special form therein. The intermediate member may be formed as a flat disk, a substantially conical shell or a spherical body. The conical shell will, as a rule, have a larger end and a smaller end but may taper in both directions if desired. It may be made for example of steel or of a metal having especially good antifriction properties or of a suitable plastic. If the intermediate member is made of plastic, it will have considerable elastic properties and will, if necessary, assume a shape determined by the externally and internally co-acting surfaces.

The invention is described in the following with reference to the accompanying drawings, in which:

FIG. 6 is a transverse sectional view showing a bearing in which the intermediate member has an outer spherical surface and an inner conical surface;

FIG. 7 shows a spiral groove bearing having a conical intermediate member;

FIG. 8 shows a vertically mounted spiral groove bearing with a conical intermediate member; and FIG. 9 is a top plan view of the conical intermediate member in the assembly of FIG. 8.

The forms shown in FIGS. 1–5 are all closed end bearings and FIGS. 6–9 show bearings in which the shafts extend through the bearing.

Figure 1:
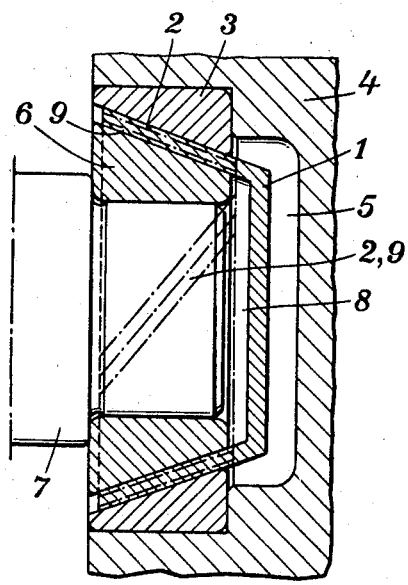
FIG. 1 is a transverse sectional view showing a conical spiral groove bearing according to the invention.

FIG. 1 shows a conical spiral groove bearing for combined thrust and radial load in which the intermediate member 1 is cup-shaped with a conical wall. Both the outer and inner conical surfaces of the wall of the member 1 are provided with shallow spirally shaped grooves 2 and 9 respectively. The cup-shaped intermediate member 1 together with an outer bearing ring 3 and a bearing housing 4 enclose a space 5 and together with an inner ring 6 and a shaft 7 it encloses another space 8. If the shaft rotates in a direction in which the groove 9 cause a rise in pressure in the space 8, the intermediate member will remain stationary since if it began to rotate with the shaft, the grooves 2 in its outer surface would cause a lower pressure in the space 5 whereby the intermediate member would be wedged against the outer ring 3. Upon rotation of the shaft in the opposite direction, a lower pressure will be created in the space 8 if the intermediate member is caused to remain stationary through the action of external forces. Due to this lower pressure, the intermediate member is pressed firmly against the inner ring 6 and therefore has a tendency to rotate together therewith.

If the intermediate member is permitted to move freely, it begins to rotate and the grooves 2 create a higher pressure in the chamber 5 and the bearing will thus be capable of carrying load.

Figure 2:
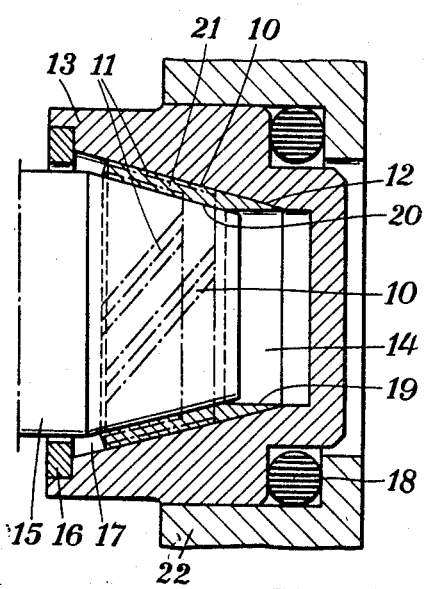
FIG. 2 is a view similar to FIG. 1 showing a somewhat different form of bearing of this kind.

FIG. 2 shows another spiral groove bearing. In this case, the intermediate member consists of an open conical sleeve 21. The outer conical surface of the sleeve has a zone with spiral grooves 10 at its greater end and has a plain zone 12 at its smaller end. The inner conical surface also has corresponding zones 11 and 20. The outer ring 13 of the bearing is in this case closed and the ring is thus cup-shaper. The tapering end of the shaft 15, the outer ring 13 and the sleeve 21 together form a closed chamber 14. If the shaft rotates in the direction in which the grooves 11 pump lubricant towards the plain zone 20 and the closed chamber 14, a lubricant film will be created between the shaft and the sleeve 21 and the pressure will be raised in the chamber 14 whereby the bearing will be able to carry a load. The sleeve 21 will then remain stationary in the outer ring and the plain zone 12 will serve to seal the bearing and prevent lubricant from leaking out between the sleeve and the outer ring. It is apparent that if the direction of rotation is reversed, the grooves 10 will instead act to pump lubricant towards the chamber 14. The sleeve will then rotate with the shaft and the plain zone 12 will prevent lubricant from leaking out between the sleeve and the shaft. In this case, also a higher pressure will be caused in the chamber 14 whereby the bearing will be capable of carrying a load. A bore 19 in the sleeve is cylindrical in form so that the higher pressure in the chamber 14 will not exert thrust on the sleeve, which would interfere with the rotation of the sleeve. Such rotation should depend entirely on the pumping effect caused by the grooves 10 and 11. It should be noted that the bore 19 need not necessarily be cylindrical along its whole length. It is necessary only that the smallest diameter of the plain zone 12 is equal to the smallest diameter of the plain zone 20. It may also be mentioned that a space for lubricant has been provided at 17. This space is sealed outwardly by a wall 16. The bearing is shown in the drawing as being mounted in a bearing housing 22. An elastic ring, for example of rubber, may suitably be inserted between the outer ring and the bearing housing in order to permit some axial movement of the outer ring in the bearing housing. Hereby the risk of over-loading the spiral groove bearing through expansion of the shaft through heating is eliminated. The contact surface of the outer ring against the housing may be spherical or a short cylinder whereby a certain amount of self-alignment of the bearing will be permitted. A bearing of this latter kind is shown in FIG. 7. It may be mentioned that the device is applicable to all cone angles up to 180°. At the limit angle 180° the intermediate member has become a flat disk having a hole at its middle.

Figure 3:
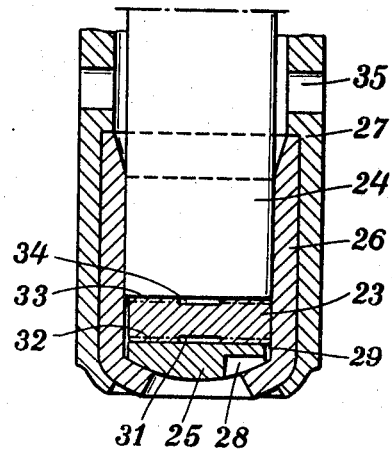
FIG. 3 is a sectional view of a spiral groove bearing in accordance with the present invention for thrust only.
Figure 4:
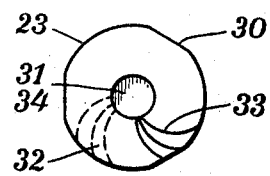
FIG. 4 is a view of the intermediate member of the bearing according to FIG. 3 seen from above.

FIG. 3 shows a spiral groove bearing for carrying purely thrust loads. It is combined with a hydrodynamic sliding radial bearing for carrying the radial load. An intermediate member for the spiral groove bearing, of which a plane view is shown in FIG. 4, has the form of a disk 23 with shallow spiral grooves 32 and 33 at both sides. The radical spiral groove bearing consists of a sleeve 26 in which a shaft 24 runs. The whole is mounted in a housing member 27 which may be immersed in a container for lubricant, e.g. oil. The grooves 32 and 33 in the disk 23 extend from its periphery to recesses 31 and 34 at the middle of the disk. The disk 23 rests on a supporting disk 25, the under surface of which is spherical, whereby a certain amount of self-alignment can take place to avoid edge-loading in the spiral groove bearing.

The lubricant surrounding the housing member 27 is admitted to the spiral groove bearing through a recess 28 in the supporting disk 25, a channel 29 between the disk and the sleeve 26 and past a number of facets 30 on the periphery of the disk 23. If the shaft rotates clockwise as seen from above, the grooves 33 will pump oil into the recess 34 where a greater pressure is created and the bearing will be able to carry thrust loads. The flat disk will then remain stationary. If, on the other hand, the shaft is rotated anti-clockwise as seen from above, the disk 23 will partake in the rotation and grooves 32 will pump lubricant into the central recess 31. Thus, the necessary lubricant film for carrying a load is obtained and also the necessary higher pressure between the disk 23 and the supporting disk 25. Holes 35 have been provided in the housing member to admit lubricant to the radial sliding bearing.

Figure 5:
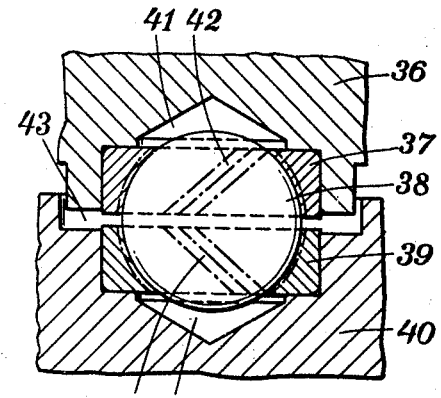
FIG. 5 shows a spiral groove bearing having a spherical intermediate member.

FIG. 5 shows an intermediate member 38 in the form of a complete sphere or ball whereby the spiral groove bearing will be completely self-aligning. The ball 38 is interposed between a rotatable member 36 and a stationary member 40. A ring 37 is mounted in the rotatable member 36 and is provided with shallow spiral grooves 42. A corresponding ring 39 is mounted in the stationary member 40 and is also provided with spiral grooves 44. In the members 36 and 40 are closed chambers 41 and 45, there also being a space 43 in the member 40 for containing lubricant. During rotation in one direction the ball remains stationary and the grooves 42 pump lubricant into the closed chamber 41. In this embodiment of the invention a lubricant film will be created between the sliding surfaces, whereby the bearing will be capable of carrying thrust loads and to a certain extent also radial loads.

All the above-described forms of the invention relate to closed end bearings. FIGS. 6, 7 and 8 described in the following relate on the other hand to bearings in which the shafts extend through the bearing housings.

FIG. 6 shows a spiral groove bearing with a conical sliding surface on an inner ring 57 thereof and a spherical sliding surface in an outer ring 58. The latter form of sliding surface has the advantage that the bearing will be self-aligning and edge-loading will be avoided. The intermediate member in this case has the shape of a sleeve having a conical inner surface and a spherical outer surface. The sleeve is provided both internally and externally with three zones of shallow spiral grooves 47, 48 and 49. These zones are separated from each other by annular deeper grooves 50, 51, 52 and 53. The annular grooves 50 and 53 are in communication with each other through a number of radial holes 54, and the grooves 51 and 52 are in communication through radial holes 55. Finally, a number of axially extending holes 56 are provided through which the grooves 51 and 53 are in communication. The spiral grooves 48 are symmetrically arranged in a herring-bone pattern, the points of junction of the grooves being at the transverse central plane of the bearing. Assuming that the bearing is rotated in a direction such that the grooves between the inner ring 57 and sleeve 46 pump lubricant towards the central plane of the bearing, the sleeve will then remain stationary in the outer ring 58. If the direction of rotation is reversed it will be the grooves between the sleeve 46 and the outer ring 58 which will pump lubricant towards the central plane of the bearing. In this case the sleeve will rotate with the inner ring 57 and slide in the outer ring 58. In both cases a load carrying lubricant film will be created near the central plane of the bearing, thus enabling it to carry load. The sleeve 46 serves the double purpose not only of making it possible to reverse the direction of rotation of the bearing, but also to return lubricant which in spite of the symmetry of the groove pattern, tends to collect at one side of the central plane. If, for example, lubricant accumulates in the groove 51 at one side of the bearing, it will be returned through the holes 56, the groove 53 and the holes 54 to the groove 50 at the opposite side. The spiral grooves 47 and 49 at the sides of the bearing act to pump lubricant in such a direction that they prevent lubricant from leaking out at the sides of the bearing.

The intermediate member of the spiral groove bearing of FIG. 7 consists of an externally and internally conical sleeve 62 interposed between an outer ring 61 and an inner ring 63. Internally and externally the sleeve 62 is provided respectively with a zone of shallow grooves 64 and 65, a plain zone 66, 67, an annular groove 68, 69 and a further zone of spiral grooves 70, 71. The grooves 68 and 69 intercommunicate through a number of radial holes 72. The spiral groove bearing is shown mounted in a bearing housing 59 having a cover plate 60. A Belleville washer 75 or the like is provided to impart an initial thrust load on the bearing in order to avoid greater clearance in the bearing than that required by the lubricant film. The spring 75, through its resiliency, also eliminates the risk of over-loading the bearing if the shaft expands axially through heating. Before starting up the bearing a lubricant space 76 in the bearing housing should be filled with lubricant. If the inner ring is rotated in one direction, lubricant will be pumped by the grooves 64 into the plain zone 66. Pressure is thus created in the lubricant which imparts load carrying capacity to the bearing. The lubricant which leaks past the plain zone into the groove 68 passes through the holes 72, the groove 69 and the radial hole 73 and further through an axially extending channel 74 back to the lubricant space 76. The grooves 70 create a pumping action in a direction to prevent leakage of lubricant out to a space 77 in the housing. During rotation in this direction the sleeve 62 remains stationary in the outer ring. If the direction of rotation is reversed, the sleeve 62 will rotate with the inner ring and the spiral grooves 65 will cause a circulation of the lubricant similar to that described above. The unsymmetrical form of spiral grooves here described may be assumed to occur as frequently as the symmetrical form shown in FIG. 6. Whether one form or the other is chosen will depend on circumstances unconnected with the present invention. The invention is applicable equally in both cases.

FIG. 8 illustrates a form of spiral groove bearing for a vertical bearing in which the shaft passes through the housing. The main parts of the spiral groove bearing comprise a sleeve 80 mounted on a shaft 81, the lower end of the sleeve having a conical bore, an intermediate member 78 which is conical both externally and internally and a ring 79 having an externally conical portion mounted in a housing 82. The intermediate member 78, of which an end view is shown in FIG. 9, is similar to that shown in FIG. 7 insofar as it is provided internally and externally with spiral groove zones 83, 87, plain zones 84, 88, annular grooves 85, 89 and further spiral groove zones 86, 90. The grooves 84 and 89 intercommunicate through a number of axial holes 91. The sleeve 80 is provided with a number of holes 92 through which the groove 89 is in communication with a lubricant chamber 93 in the bearing housing. Upon rotation in one direction, the spiral grooves 87 pump lubricant from the chamber 93 into the plain zone 88 thus creating a lubricant film under pressure which makes it possible for the bearing to carry load. Lubricant which leaks past the plain zone is returned to the chamber 93 through the groove 89 and the holes 92. The spiral grooves 90 pump lubricant in such a direction that leakage along the shaft cannot take place. During this rotation the intermediate member remains stationary, but if the direction of rotation is reversed, it will rotate with the sleeve 80.

In this latter case the spiral grooves 83 will pump lubricant past the plain zone 84 to the groove 85 from which it is returned to the chamber 93 through the axial holes 91.

While particular embodiments of the present invention have been illustrated and described herein, it is to be understood that changes and modifications made be made within the scope of the following claims.

I claim:

1. A reversible sliding bearing assembly comprising a stationary member, a rotatable member, said members having sliding surfaces, an intermediate member disposed between said sliding surfaces of said stationary and rotatable members and having sliding surfaces conforming to the sliding surfaces of said rotatable and stationary members, means defining grooves in the confronting sliding surfaces of said members operable between the intermediate member and stationary member and between the intermediate member and rotatable member to effect pressure build up of a fluid medium between the confronting surfaces supporting the rotatable member for rotation relative to the stationary member, whereby upon rotation of the rotatable member in one direction, the intermediate member will be rotated with the rotatable member and stationary relative to rotatable member and upon rotation of the rotatable member in the opposite direction, the intermediate member will be stationary on the stationary member.

2. A bearing according to claim 1, characterized thereby that the intermediate member has the form of a shell.

3. A bearing according to claim 1, characterized thereby that the intermediate member consists of a flat disk.

4. A bearing according to claim 1 characterized thereby that the intermediate member consists of a spherical body.

5. A bearing according to claim 1 characterized thereby that the intermediate member is provided with a bottom to form a cup-shaped member.

6. A bearing according to claim 1, characterized thereby that the intermediate member consists of a substantially conical sleeve open at both ends.

7. A bearing according to claim 6, characterized thereby that the conical sleeve has at its smaller end a cylindrical bore extending between the outer and inner conical surfaces of the sleeve.

8. A bearing according to claim 1, characterized thereby that the intermediate member is conical both externally and internally.

9. A bearing according to claim 1, characterized thereby that at least one of the surfaces of the intermediate member forms part of a spherical surface.

10. A bearing according to claim 1, characterized thereby that the intermediate member is made of an elastic material such as plastic.

11. A bearing according to claim 1, characterized thereby that the intermediate member has a portion provided with shallow spirally shaped grooves and another portion having a plain surface.

12. A bearing according to claim 1, characterized thereby that the intermediate member has a portion provided with shallow helically shaped grooves and another portion having a plain surface.

13. A bearing according to claim 1 characterized thereby that the intermediate member is provided with a number of holes extending between its inner and outer surfaces.

14. A bearing according to claim 13 characterized thereby that the intermediate member is provided with a number of radial holes extending between its inner and outer surfaces.

15. A bearing according to claim 13 characterized thereby that the intermediate member is provided with a number of axial holes extending between its inner and outer surfaces.

16. A bearing according to claim 13 characterized thereby that the intermediate member is provided both externally and internally with annular grooves connecting said holes.

17. A bearing according to claim 3 characterized thereby that the flat disk comprising the intermediate member is provided with recesses centrally located in its faces.

18. A bearing according to claim 3 characterized thereby that the intermediate member is provided with a centrally located bore.

19. A bearing according to claim 18 characterized thereby that a zone having a plain surface is provided between a zone having spiral grooves nearer the periphery of the disk and another similar zone nearer the central bore.

20. A bearing according to claim 3 characterized thereby that the disk is faceted at its periphery to form lubricant passages from one side to the other thereof.

21. A bearing according to claim 1 characterized that a supporting disk upon which the intermediate member rests is supported in a self-aligning manner.

22. A bearing according to claim 1 characterized thereby that the stationary member comprises an outer ring provided with a spherical or short cylindrical surface for contact with a bearing housing and that the axial support for the said outer ring is resilient, there being means for adjusting the amount of the resiliency thereof.

23. A bearing according to claim 1 characterized by the provision of a substantially circular lubricant space at the mouths of said grooves.

References Cited

UNITED STATES PATENTS

| 861,370 | 7/1907 | Lansden. |
| 1,674,453 | 6/1928 | Sloper. |
| 2,653,062 | 9/1953 | Sperisen. |

MARTIN P. SCHWADRON, *Primary Examiner.*

FRANK SUSKO, *Assistant Examiner.*